May 14, 1968  G. SCHULZ ET AL  3,382,659
BOBBIN TRANSPORTING APPARATUS
Filed Dec. 15, 1966  4 Sheets-Sheet 3
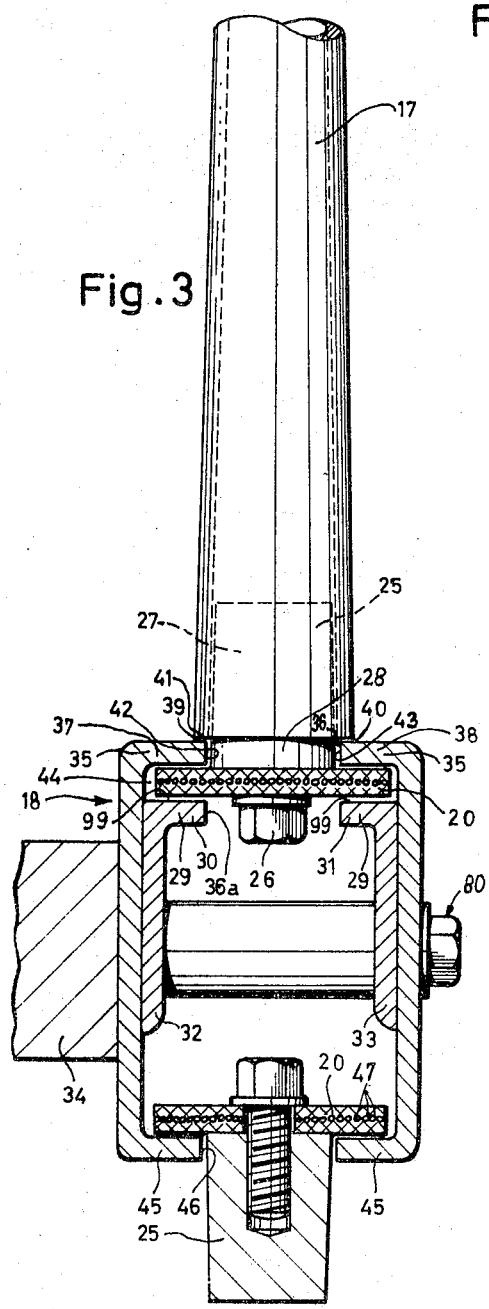
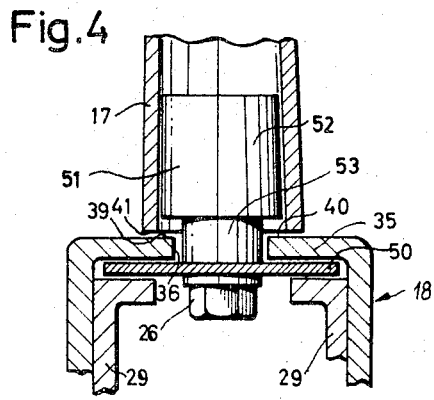
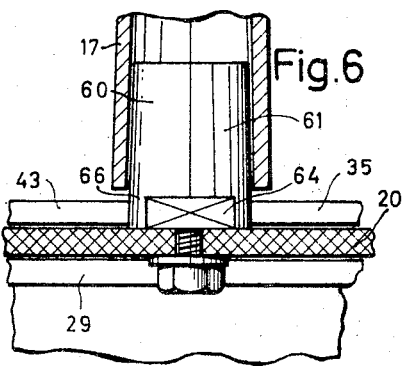
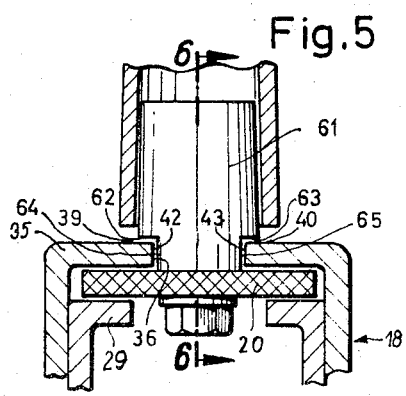
Inventors
Günter Schulz
Wolfgang Igel
Hansjörg Baur
Werner Weber
by Michael J. Striker

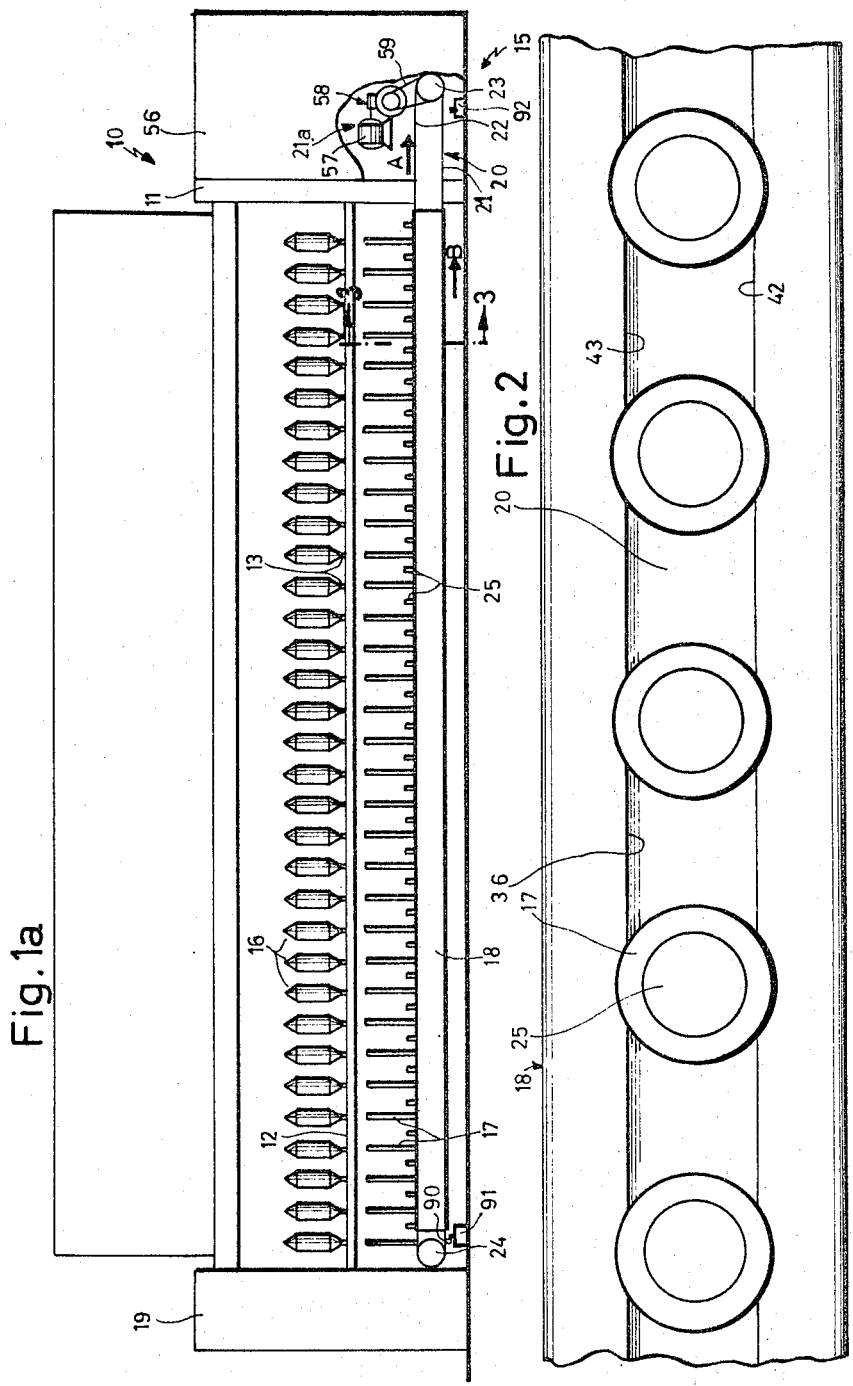

United States Patent Office 3,382,659
Patented May 14, 1968

3,382,659
BOBBIN TRANSPORTING APPARATUS
Guenter Schulz, Wolfgang Igel, and Hansjörg Walk, Ebersbach (Fils), and Werner Weber, Esslingen, Germany, assignors to Zinser-Textilmaschinen Gesellschaft mit beschränkter Haftung, Ebersbach (Fils), Germany
Filed Dec. 15, 1966, Ser. No. 601,997
Claims priority, application Germany, Apr. 7, 1966, Z 12,154
13 Claims. (Cl. 57—54)

ABSTRACT OF THE DISCLOSURE

An endless conveyor having a row of holders for empty and full bobbins, is moved along rigid guide means in opposite directions to and from an operative position in which the holders are located in the proximity of the spindles of a spindle rail. Loading means for loading empty bobbins on the holders, and receiving means for receiving full bobbins, are located at the same end of the conveyor, together with the drive means by which the conveyor is moved.

---

An application number 592,112 assigned to the same assignee and entitled, "Apparatus for Loading Bobbins on Holders," was filed by Wolfgang Igel et al. on or about Nov. 4, 1966.

Background of the invention

The present invention relates to an apparatus for transporting empty bobbins to the spindles of the spinning rail of a textile machine, and for transporting full bobbins away from the same. Donning means are provided for placing empty bobbins on the spindles, and doffing means are provided for removing the full bobbins from the spindles and for placing the same on the conveyor means. The spindle rail may be part of a spinning or twisting machine of known construction. The donning and doffing means include grippers for gripping the bobbins.

The spindle rails of textile machines are generally very long and supports a great number of spindles. For example, 200 and more spindles are mounted on either side of a spinning machine. Doffing means simultaneously remove full bobbins from the spindles on one side of the machine, and donning means place empty bobbins on the spindles. In order to avoid any disturbance of the exchange of full and empty bobbins, it is necessary that bobbin holders on the conveyor means are in exactly defined positions in relation to the spindles when full bobbins are placed on the holders by doffing means, and when empty bobbins are removed from the holders by the donning means.

The required precise relative position between the bobbin holders of the conveyor means on one hand, and the spindles of the textile machine on the other hand, is not reliably maintained in constructions of the prior art, particularly after a long period of use of the conveyor means.

Summary of the invention

It is one object of the invention to overcome this disadvantage of known bobbin transporting devices, and to provide a bobbin transporting apparatus which accurately and reliably operates even after a long period of use.

Another object of the invention is to provide a bobbin transporting apparatus in which the bobbin holders are least exposed to fibers and dust contained in the air.

Another object of the invention is to provide a bobbin transporting apparatus which does not obstruct the operation of the textile machine, requires little space, and can be added to an existent textile machine without requiring substantial alterations of the machine.

With these objects in view, the present invention relates to a bobbin transporting apparatus for transporting into the proximity of a spindle rail having a row of spindles, empty bobbins which are to be donned on the spindles, and for transporting full bobbins which have been doffed from the spindles. One embodiment of the invention comprises conveyor means having two runs, and at least one row of bobbin holders mounted on the conveyor means for supporting empty and full bobbins; loading means located at one end of the conveyor means for loading empty bobbins onto the holders; a receiving station located at the same end for receiving full bobbins from the holders; and drive means for moving the conveyor means so that the holders pass the loading means and the receiving station. The row of bobbin holders has substantially the same length as the row of spindles.

The drive means is reversible for moving the conveyor means between a first operative position in which the row of holders is located along the row of spindles, and a second position in which the holders are spaced from the row of spindles. The number of holders in the row may be the same as the number of spindles, but in modified embodiments of the invention, the number of holders is twice the number of spindles so that full bobbins can be placed on a set of alternate holders, while emtpy bobbins are still supported by the other set of alternate holders.

The conveyor means is preferably an endles flexible conveyor belt, which may be a metal band or a band consisting of a flexible synthetic material reinforced by longitudinally extending fibers. In order to have the bobbin holders arranged in a row exactly parallel to the row of spindles, it is preferred to support at least the upper run of the endless conveyor belt, and preferably both runs, by rigid straight guide means. An even more precise guidance is obtained by additional guide means for holders, and further guide means are advantageously provided for guiding the bobbins mounted on the holders.

The loading means by which empty bobbins are automatically placed on the holders of the endless conveyor, may be of the type disclosed in detail in the above-mentioned copending application Igel et al. The receiving station may be a container located at the end of the conveyor and receiving full bobbins dropping off the holders when the same turn to a downwardly projecting position when moving onto the lower second run of the conveyor. The receiving station may be constructed as disclosed in the U.S. Patent 1,463,479.

Due to the fact that the loading and receiving stations are combined in a unit and disposed at one end of the conveyor, in contrast to the prior art, they take up very little space, and it is possible to add the unit to an existent textile machine. This arrangement according to the present invention, in combination with the novel arrangement of the bobbin holders on the conveyor, and the rigid guiding of the conveyor, results in a particularly fast but extremely reliable bobbin transporting operation.

Rigid guide means according to the invention do not only assure a precise positioning of the bobbin holder in relation to the spindle rail and the spindles, as well as to the doffing and donning means, but has the additional advantage that the conveyor band has to be tensioned only very little so that undesired stretching of the conveyor band is avoided which would influence the relative position of the bobbin holders. In the preferred embodiment of the invention, in which not only the conveyor band, but also the bobbin holders and the bobbins mounted thereon are guided by rigid guide means, a tilting of the bobbin holders relative to the conveyor is prevented.

Due to the novel arrangement of the bobbin holders on the conveyor, in combination with the arrangement of the loading and receiving stations at the same end of the conveyor and textile machine, the required number of bobbin holders and consequently the weight of the entire transporting apparatus is reduced. Due to the reduction of the weight, the tension of the conveyor band can be further reduced, resulting also in a reduction of the cost of the apparatus.

It is particularly advantageous that the drive means are reversible for reversing the direction of movement of the conveyor so that the same is moved between an operative position in which the exchange of the bobbins take place, and an inoperative position in which the bobbin transporting apparatus does not obstruct access to the spindles.

It is preferred that immediately after the exchange of the full and empty bobbins, the conveyor is moved to the second position and remains in the same until shortly before the beginning of the next following bobbin exchange operation. Since in this second position the bobbin holders are not located in the proximity of the spindles, they are out of the way during the winding of the package. Furthermore, the bobbin holders are better protected in the second position from deposits of dust and fibers contained in the ambient air. The loading of empty bobbins takes place only shortly before or after the termination of a winding operation, so that during the same the empty bobbins are not yet in a position in which they are exposed to fiber and dust deposits.

It is known to load bobbin transporting apparatus with empty bobbins before full bobbins are doffed from the spindles. The construction of the present invention has particular advantages in combination with this sequence of operations. However, the invention is also applicable to other arrangements in which first the full bobbins are transported to the receiving station, whereupon the empty bobbins are loaded onto the holders of the conveyor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Brief description of the drawing

FIG. 1a is a schematic front view illustrating a spinning machine provided with a bobbin transporting apparatus according to the invention, parts of the machine which have no bearing on the invention being omitted for the sake of simplicity;

FIG. 2 is a fragmentary plan view illustrating on an enlarged scale, a portion of a conveyor means according to the invention;

FIG. 3 is a sectional view taken on line 3—3, and illustrating one embodiment of a bobbin transporting apparatus on an enlarged scale;

FIG. 4 is a cross-sectional view illustrating a modified construction of the transporting apparatus;

FIG. 5 is a cross-sectional view illustrating another modification of the transporting apparatus;

FIG. 6 is a sectional view taken on line 6—6 in FIG. 5;

Description of the preferred embodiments

Figure 1B:
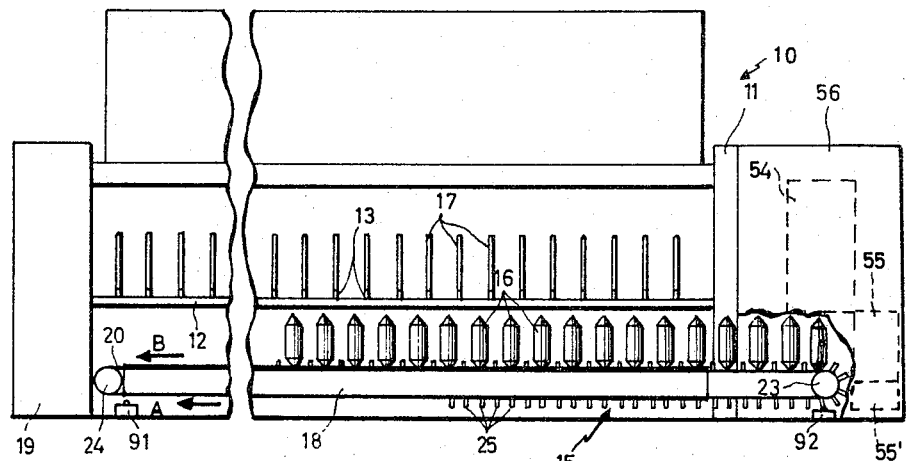
FIG. 1b is a schematic front view of the spinning machine and bobbin transporting apparatus of FIG. 1a in another operational position.
Figure 11:
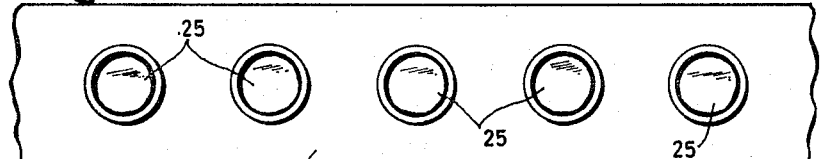
FIG. 11 is a fragmentary plan view of the arrangement of the bobbin holders in the apparatus of FIGS. 1a and 1b.

Referring now to the drawings in which like parts are indicated by like reference numerals, and more particularly to FIGS. 1a, 1b, and 11, a bobbin transporting apparatus 15 is provided on a conventional spinning machine 10 which has two end supports 10 and 11 supporting a horizontal spindle rail 12 on which a row of spindles 13 is mounted. As shown in FIG. 1a, full bobbins with a wound package 16 are mounted on spindles 13, while an endless conveyor belt carries empty bobbins on every second holder of a row of holders 25 which are spaced half the distance of the distance between the spindles, as shown in FIG. 11. The full bobbins are exchanged for the empty bobbins on the conveyor by donning and doffing means, not shown, in a conventional operation during which grippers grip and exchange full and empty bobbins.

In the operational position of FIG. 1b, the empty bobbins 17 have already been placed on the spindles 13, while the full bobbins 16 are placed on every second holder 25 and are in the process of being transported to a position in which the holders 25 discharge the full bobbins at a delivery station 55 where the bobbins drop off the downwardly inclined holders when the conveyor belt passes about the wheel 23. In the proximity of the receiving staiton which may include a container 55' for the discharged bobbins, a loading station 54 is provided by which empty bobbins are automatically placed on every alternate holder 25. A drive motor 57 drives conveyor wheel 23 through a pulley and belt transmission 59 and a gear transmission 58. The drive means, the loading stations 54, and the receiving station 55 are combined in a unit 56 which can be added to an existent spinning machine and mounted on the end support 11. The loading station is preferably of the type disclosed in the abovementioned copending application "apparatus for loading bobbins on holders."

The endless conveyor belt has an upper run and a lower run and is guided over conveyor wheels 23 and 24. The conveyor band portions 21 and 22 which form the lower and upper runs are guided in a casing 18 which is constructed to serve as a rigid guide means for the two runs of the conveyor belt 20. As shown in FIG. 3, holders 25 are frusto-conical plugs projecting from the conveyor band and secured, for example, by screws 26. In the contsruction of FIG. 4, holders 25 have a reduced neck. The hollow tapered bobbin tubes 17 are frictionally held on the frusto-conical holders 25.

In the embodiment illustrated in FIGS. 2 and 3, casing 18 has first guide means for guiding the conveyor belt and second guide means for guiding the holders and the bobbins 17. The first guide means include upper guide rail means 29 constructed of two parallel guide rails 30 and 31 located in the same plane and being parallel to each other. The top faces 39 slidingly support the longitudinal edge portions of the conveyor belt 20 and form between each other a longitudinally extending slot 36a. Guide rail means 30 and 31 have an angular cross-section and have portions 32, 33 secured to casing 18 by a spacer tube and a screw 80 which passes through the spacer tube and is threaded into a frame bar 34 of the spinning machine so that the two casing parts and the guide rails 30 and 31 are supported on the frame of the spinning machine.

The second guide means include a pair of guide rails 35 which are part of casing 18 and have confronting faces 37 and 43 and top faces 39, 40. Guide rails 35 form a slot 36 between the fronting faces 37, 43 in which the necks 28 of holders 25 are located and laterally guided during movement of the conveyor.

The annular bottom faces 41 of bobbins 17 slide on slide faces 39 and 40 so that a straight position of the bobbins is assured. The guide rails 29 and 35 form a pair of channels 44 in which the longitudinal edge portions of the conveyor belt are guided so that it need not be substantially tensioned by conveyor wheels 23 and 24 to be maintained in a horizontal straight position exactly parallel to the spindle rail, which is necessary for precisely performing the donning and doffing operations.

The lower run 21 of the conveyor belt is guided on guide means 45 forming part of casing 18. Guide means 45 is formed by two rails having confronting end faces 46 forming a slot for the passage of holders 25 in downwardly projecting positions. The top faces of guide rails 45 slidingly support the conveyor belt, which also results in a reduction of the tension of the conveyor belt.

In the embodiment of FIG. 3, the conveyor belt is shown to be a band consisting of a flexible synthetic material in which polyester reinforcing cords 47 extending in longitudinal direction are embedded.

In the modification illustrated in FIG. 4, the casing is constructed as described with reference to FIG. 3, but the conveyor belt is formed by a flexible metal band 50. The holders 51 have a frusto-conical head 52 for supporting bobbins 17, and a cylindrical neck 53 whose diameter is substantially smaller than the diameter of the frusto-conical head 52. Consequently, the sliding of the annular bottom face 41 on the top faces 39, 40 of the guide rails is facilitated and improved.

In the embodiment illustrated in FIGS. 5 and 6, the holder 61 has a frusto-conical head 60 whose lower portion is laterally reduced on opposite sides to form two lateral rectangular planar faces 64 and 65, and two segment shaped planar bottom faces 62 and 63. Guide walls 35 have corresponding top slide faces 39 and 40 and confronting lateral faces 42 and 43 for guiding the holders.

Figures 7, 9:
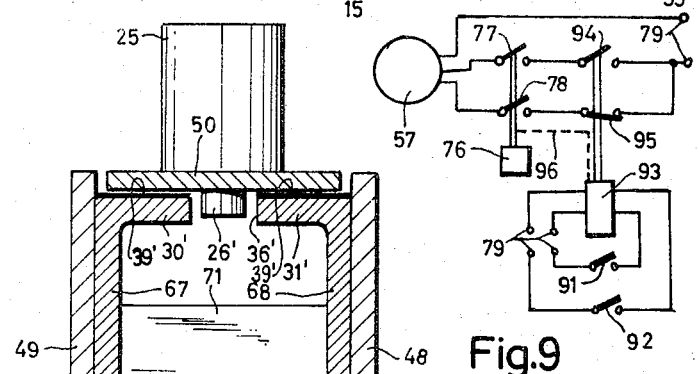
FIG. 7 is a cross-sectional view illustrating another modification of the transporting apparatus.
FIG. 9 is a diagram illustrating an electric circuit for controlling the operation of the transporting apparatus by drive means.
Figure 8:
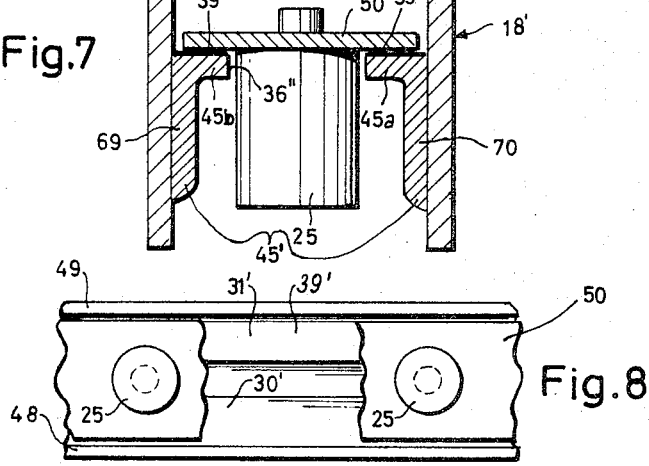
FIG. 8 is a fragmentary plan view illustrating a portion of the transporting apparatus of FIG. 7 on a reduced scale, some parts being omitted for the sake of clarity.

FIGS. 7 and 8 illustrate another embodiment which comprises an upper guide means 29′ and a lower guide means 45′. Guide means 29′ includes two guides rails 30′, 31′ defining a longitudinal slot 36′, and guide means 45′ includes two guide rails 45a, 45b defining a guide slot 36″. Slot 36′ is narrow and permits the passage of a rivet head 26′ by which holder 25 is secured to the conveyor belt. Slot 36″ is of sufficient width to permit the passage of the downwardly projecting holders 25 carried by the lower run of the conveyor belt. The slide faces 39′ and 39″ of the guide rails guide the conveyor belt 50 in a straight horizontal position parallel to the spindle rail. Guide rails 30′, 31′, 45a, 45b are angular bars having lateral legs 67 to 70 secured to vertical walls 48 and 49 of casing 18′. Transverse connecting members 71 connect walls 48 and 49 and guide rails 67, 68 with each other.

As shown in FIGS. 1a and 1b, bobbin holders 25 are mounted only on a part of the conveyor belt so that the length of the row of bobbin holders corresponds to the length of the spindle rail and of the row of spindles. The remaining part of the conveyor belt is free of bobbin holders. In the embodiment illustrated in FIGS. 1a, 1b, and 11, the plug-shaped bobbin holders 25 are arranged in a single row and spaced from each other half the pitch distance between two adjacent spindles 13. Consequently, twice as many bobbin holders are provided on the conveyor belt than there are spindles on the spindle rail. This has the advantage that the full and empty bobbins can be simultaneously supported by the conveyor belt. For example, at the beginning of the bobbin exchanging operation, empty bobbins are placed at the loading station on every second bobbin holder, whereupon the conveyor belt is moved to a position in which the other set of alternate empty bobbin holders is positioned in relation to the spindles 13 to receive from the same the full bobbins by operation of the doffing means, not shown. Thereupon, the donning means, not shown, grip the empty bobbins on the conveyor belt and place the same on spindles 13. The conveyor belt is then moved in the direction of the arrow A to the receiving station 55 where the full bobbins drop off the bobbin holders 25 and fall into a container 55′ when the bobbin holders 25 passing over conveyor wheel 23 assume a downwardly slanted position.

Figure 12:
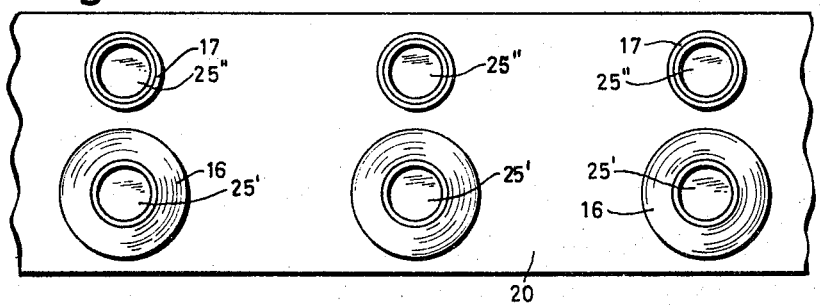
FIG. 12 is a fragmentary plan view illustrating a modified arrangement of the bobbin holders on the conveyor of the present invention.
Figure 13:
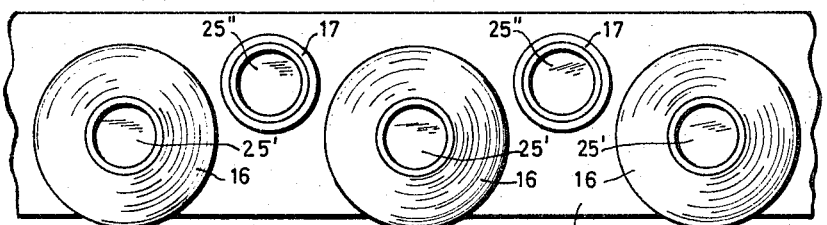
FIG. 13 is a fragmentary plan view illustrating another arrangement of the bobbin holders according to the invention.

In a modified arrangement according to the invention, the bobbin holders are disposed in two parallel rows. FIGS. 12 and 13 illustrate two modifications of this arrangement. In the construction of FIG. 12, pairs of transversely adjacent bobbin holders 25′ and 25″ are provided. The pairs of bobbin holders are spaced the same distance as the spindles 25, as is apparent from a comparision with FIG. 12.

In the embodiment of FIG. 13, the bobbin holders 25″ are staggered in longitudinal and transverse directions to the bobbin holders 25″ so that the available space is better used as compared with the arrangement of FIG. 11.

Figure 10:
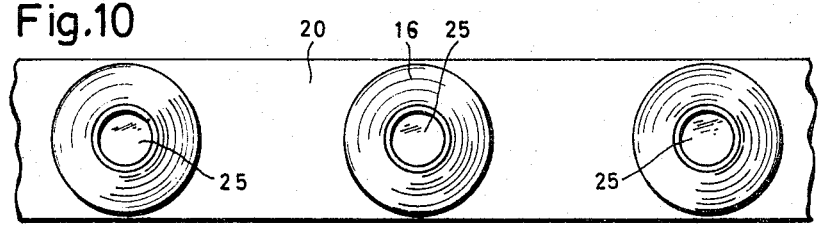
FIG. 10 is a fragmentary plan view illustrating a modified conveyor.

Another modification of the arrangement of the bobbin holders on the conveyor belt is illustrated in FIG. 10. The bobbin holders 25 are spaced from each other the same distance as the spindles of the spindle rail, and the same number of bobbin holders 25 and spindles 13 are provided. This requires a different operation, and it is necessary to first transfer the full bobbins from the spindles to the bobbin holders and to move the conveyor band in the direction of the arrow A in FIG. 1b to deposit the full bobbins at the receiving station 55. Thereupon, the conveyor band is moved in the direction B to place the empty bobbins at the loading station 54 on the bobbin holders until finally all empty bobbins are located opposite the corresponding spindles 13 and can be transferred to the same.

Figure 14:
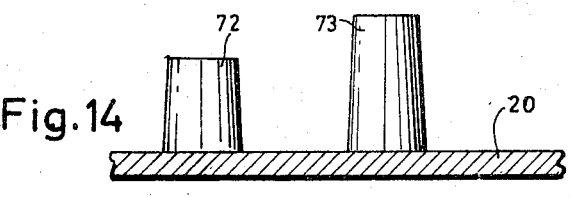
FIG. 14 is a fragmentary front view, partially in section, illustrating another modification of the bobbin holders.

In the modification of FIG. 14, the bobbin holders are spaced half the distance between two spindles 13, as in the embodiment of FIG. 11. However, alternate sets of bobbin holders 72 and 73 are of different height, and the shorter frusto-conical bobbin holders 72 are used for supporting full bobbins, while the higher frusto-conical bobbin holders 73 are used for supporting the empty bobbins. Due to the lesser height of bobbin holders 72, the dropping off of full bobbins into the receiving container 55′ is facilitated, while on the other hand the higher bobbin holder 73 more precisely mount the empty bobbins so that the empty bobbins are simultaneously reliably gripped by the donning means and placed on the corresponding adjacent spindles 13.

FIG. 9 illustrates a diagram of a preferred circuit for reversing the direction of drive motor 57. The motor 57 has a first terminal connected to one pole of a voltage source 79, and two other terminals respectively connected through relay contacts 77, 94 and 78, 94 with the other terminal of the voltage source. Relay switches 77 and 78 are operated by a relay winding 76 and are also connected with a relay winding 93 as schematically indicated at 96. Relay winding 93 controls the relay switches 94 and 95. Relay winding 93 is connected to a voltage source 79 by limit switches 91 and 92 which are shown in FIGS. 1a and 1b, and which are operated by a switch actuator arm 90 shown on the left side of FIG. 1a. In the position of FIG. 1a in which the row of bobbin holders is located adjacent the row of spindles, actuator arm 90 has just engaged and operated limit switch 91. When all bobbin holders 25 are located on the lower run of the conveyor belt 18, actuator arm 90 operates the other limit switch 92.

When relay winding 76 is energized by a switch, not shown, relay switches 77 and 78 are actuated. When the conveyor belt assumes the position of FIG. 1 and actuator arm 90 operates limit switch 91, relay winding 93 is energized and opens relay switch 94 while closing relay switch 95, as shown in FIG. 9. This causes a reversal of the previous direction of rotation of drive motor 57. At the same time, through connections 96, relay switches 77 and 78 are opened so that the conveyor belt 18 stops in the position of FIG. 1a, permitting the exchange of empty bobbins for full bobbins. When the relay 76 is again operated and energized, switches 77 and 78 close and the conveyor band is driven in the direction of the arrow A to a position in which the bobbin holders are located on the lower run of the conveyor belt, in which position actuator arm 90 operates limit switch 92 so that relay 93 is again energized to open switches 77 and 78, and to simultaneously operate switches 94 and 95 to reverse the direction of rotation of motor 57. Since switches 77 and 78 are open, the motor cannot start its rotation until relay 76 is again energized which will cause closing of switches 77 and 78, and start of the conveyor in the direction of the arrow B back to its operative position shown in FIG. 1a.

During the winding of the packages on the bobbins on spindles 13, the conveyor belt is in a position in which all bobbin holders are located on the lower run of the conveyor belt and points downward. No bobbins are supported on the bobbin holders, since the bobbins have dropped off at the receiving station 55, 55' during the preceding movement in the direction of the arrow A in FIG. 1b. Since the bobbin holders are located under casing 18, and partly enveloped by the same in the embodiment of FIG. 7, they are protected from dust and fiber deposits. No bobbin holders are located on the upper run of conveyor 20 in this position, so that the operation of the spinning machine is in no way obstructed by the bobbin holders. It is even possible for the operator of the machine to step onto the top surface of the casing 18, particularly in the constructions of FIGS. 3 to 6. When the winding of the packages on the bobbins on the spindle rail has been completed, relay 76 is energized. Since limit switch 92 was previously operated by actuator arm 90, switches 94, 95 are in a position in which motor 57 drives conveyor belt 20 in the direction of the arrow B. As the bobbin holders 25 successively pass the loading station 94, every second bobbin holder is provided with an empty bobbin 17, and finally the position of FIG. 1a is assumed in which switch actuator arm 90 operates limit switch 91 so that relay 93 is energized and shifts switches 94 and 95 to a position in which the direction of rotation of motor 57 is reversed. However, the motor does not start since switches 77 and 78 are still open.

The doffing means, not shown, are operated in the conventional manner to place the full bobbins on every second empty bobbin holder 25, whereupon the donning means, not shown, are operated in the conventional manner to transfer the empty bobbins 17 from holders 25 to spindles 13.

In a modified arrangement, the empty bobbin holders are aligned with spindles 13 during the transfer of the full bobbins to the empty bobbin holders, and the bobbin holders carrying empty bobbins are respectively aligned with the spindles during the transfer of the empty bobbins to the spindles. In such an arrangement, it is necessary to operate motor 57 to shift the conveyor band one step.

In any event, after the exchange of the empty and full bobbins, relay 76 is energized and closes switches 77 and 78 which were previously opened by relay 93. Motor 57 is connected to the voltage source and drives conveyor belt 20 in the direction A so that the full bobbins 16 drop off the bobbin holders 25 when the same assume a downwardly slanted position in passage over conveyor wheel 23. When all bobbin holders 25 are located on the lower run of the conveyor, actuator arm 90 operates limit switch 92, effecting a reversal of the motor and stopping of the same so that packages can be wound on the empty bobbins on spindles 13 while the conveyor belt 20 is at a standstill with the bobbin holders pointing downwardly from the lower run of the conveyor.

Due to the fact that the drive motor 57, the loading station 54, and the delivery station 55 are supported and enclosed in a common housing 56, the bobbin transporting apparatus can be added to an existent textile machine, such as a spinning machine or twisting machine, where it is positioned at the end of the spindle rail. The manner in which the doffing and donning of the bobbins is carried out is well known, and not an object of the invention. The full and empty bobbins may be exchanged in any suitable manner.

It will be understood that each of the elements described above, or two or more together, may also find a useful application in other types of bobbin transporting apparatus differing from the types described above.

While the invention has been illustrated and described as embodied in a bobbin transporting apparatus having a loading station and a delivery station located at the same end of a conveyor belt carrying bobbin holders, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Bobbin transporting apparatus for transporting into the proximity of a spindle rail having a row of spindles, empty bobbins for the donning of the empty bobbins on the spindles, and for transporting full bobbins doffed from the spindles, comprising, in combination, conveyor means including a conveyor extending along the spindle rail and having two ends and two runs connecting said ends, and at least one row of bobbin holders mounted on said conveyor for supporting empty and full bobbins, said row of bobbin holders having at least the same length as said row of spindles; rigid guide means for guiding at least one of said runs along at least a part of the length thereof for movement along said spindle rail; and a second guide means parallel to said spindle rail for guiding said holders along at least part of said one run along said spindle rail.

2. Bobbin transporting apparatus for transporting into the proximity of a spindle rail having a row of spindles, empty bobbins for the donning of the empty bobbins on the spindles, and for transporting full bobbins doffed from the spindles, comprising, in combination, conveyor means including a conveyor extending along the spindle rail and having two ends and two runs connecting said ends, and at least one row of bobbin holders mounted on said conveyor for supporting empty and full bobbins, said row of bobbin holders having at least the same lengths as said row of spindles; rigid guide means for guiding at least one of said runs along at least a part of the length thereof for movement along said spindle rail; and other guide means parallel to said spindle rail for guiding bobbins on said holders along at least part of said one run along said spindle rail.

3. Bobbin transporting apparatus for transporting into the proximity of a spindle rail having a row of spindles, empty bobbins for the donning of the empty bobbins on the spindles, and for transporting full bobbins doffed from the spindles, comprising, in combination, conveyor means including a conveyor extending along the spindle rail and having two ends and two runs connecting said ends, and at least one row of bobbin holders mounted on said conveyor for supporting empty and full bobbins, said row of bobbin holders having at least the same length as said row of spindles; and rigid guide means parallel to said spindle rail and located in the region of one of said runs, said rigid guide means including first guide rail means for guiding said one run along at least part of the length thereof, second guide rail means for guiding said holders along a straight path parallel to said spindle rail, and third guide rail means for guiding bobbins on said holders along a straight path parallel to said spindle rail.

4. Bobbin transporting apparatus for transporting into the proximity of a spindle rail having a row of spindles, empty bobbins for the donning of the empty bobbins on the spindles, and for transporting full bobbins doffed from the spindles, comprising, in combination, conveyor means including an endless conveyor belt having two horizontal band portion forming two runs of said conveyor belt and at least one row of bobbin holders mounted on said conveyor belt for supporting empty and full bobbins, said row of bobbin holders having at least the same lengths as said row of spindles; and a pair of rigid guide channels receiving the edges of one of said band portions for guiding the same along the spindle rail, said pair of guide channels being spaced in a direction transverse to said one band portion to form a slot for receiving and guiding said holders and being adapted to guide bobbins on said holders.

5. Bobbin transporting apparatus for transporting into the proximity of a spindle rail having a row of spindles, empty bobbins for the donning of the empty bobbins on the spindles and for transporting full bobbins doffed from the spindles, comprising, in combination, conveyor means including an endless conveyor belt having upper and lower runs, and at least one row of bobbin holders mounted on said conveyor belt for supporting empty and full bobbins, said row of bobbin holders having at least the same lengths as said row of spindles; and a guide casing for said conveyor belt extending along said runs and including upper and lower guide rail means parallel to said spindle rail for guiding said runs, and forming slots for guiding said holders.

6. Bobbin transporting apparatus as defined in claim 1 wherein said second guide means include a pair of parallel guide rails spaced in a direction transverse to the longitudinal direction thereof so as to form a longitudinal slot in which said holders are located and guided during movement of said conveyor.

7. Bobbin transporting apparatus as defined in claim 2 wherein said other guide means include a pair of parallel guide rails spaced in a direction transverse to the longitudinal direction thereof so as to form longitudinal slot faces on which said bobbins are located and guided during movement of said conveyor.

8. Bobbin transporting apparatus as defined in claim 3 wherein said first, second and third guide rail means each include two transversely spaced guide rails for engaging and guiding opposite sides of said one run of said conveyor, of said holders, and of said bobbins, respectively.

9. Bobbin transporting apparatus as defined in claim 4 wherein said channels have on top elongated longitudinally extending guide faces for guiding said bobbins.

10. Bobbin transporting apparatus as defined in claim 4 wherein each of said channels has two spaced horizontal walls, one of said walls of each channel having a guide face disposed so that said guide faces form a slot for the passage of said holders; and wherein each holder has a pair of guide faces on opposite sides thereof slidingly guided by said guide faces of said walls.

11. Bobbin transporting apparatus as defined in claim 10 wherein each holder has a pair of horizontal guide faces respectively in sliding engagement with the top faces of the upper walls of each said channels and extending parallel with said one band portion.

12. Bobbin transporting apparatus as defined in claim 10 wherein each holder has a pair of lateral guide faces respectively in sliding engagement with vertical guide faces of said walls of said channels.

13. Bobbin transporting apparatus as defined in claim 10 wherein said walls of said channels have vertical guide faces for guiding lateral guide faces of each holder, and horizontal guide faces on top for guiding bottom faces of bobbins mounted on said holders.

References Cited

UNITED STATES PATENTS

| | | | |
|---|---|---|---|
| 1,770,099 | 7/1930 | D'Humy et al. | 198—204 |
| 2,169,772 | 8/1939 | Schweitzer | 198—204 XR |
| 3,024,887 | 3/1962 | Ingham | 57—54 |
| 3,054,249 | 9/1962 | Bahnson | 57—54 XR |
| 3,082,908 | 3/1963 | Ingham | 57—54 |
| 3,198,319 | 8/1965 | Blume | 198—204 |

FOREIGN PATENTS

| | | |
|---|---|---|
| 686,980 | 5/1964 | Canada. |
| 87,526 | 2/1958 | Netherlands. |

FRANK J. COHEN, *Primary Examiner.*

W. H. SCHROEDER, *Assistant Examiner.*